US009983465B2

(12) United States Patent
Liou

(10) Patent No.: US 9,983,465 B2
(45) Date of Patent: May 29, 2018

(54) PROJECTOR

(71) Applicants:QISDA OPTRONICS (SUZHOU) CO., LTD., Suzhou, Jiangsu Province (CN); QISDA CORPORATION, Taoyuan (TW)

(72) Inventor: Yu-Ting Liou, Taoyuan (TW)

(73) Assignees: Qisda Optronics (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 392 days.

(21) Appl. No.: 14/745,482

(22) Filed: Jun. 22, 2015

(65) Prior Publication Data

US 2015/0378248 A1   Dec. 31, 2015

(30) Foreign Application Priority Data

Jun. 27, 2014  (TW) .............................. 103122296 A

(51) Int. Cl.
*G03B 21/14* (2006.01)
*G03B 21/16* (2006.01)

(52) U.S. Cl.
CPC ........... *G03B 21/16* (2013.01); *G03B 21/145* (2013.01)

(58) Field of Classification Search
CPC ................................ G03B 21/14; G03B 21/16
See application file for complete search history.

(56) References Cited

U.S. PATENT DOCUMENTS

| 7,270,419 | B2 * | 9/2007 | Russell | G03B 21/16 |
| | | | | 353/58 |
| 7,441,903 | B2 * | 10/2008 | Kim | G03B 21/16 |
| | | | | 348/748 |
| 7,535,710 | B2 * | 5/2009 | Yang | G03B 21/16 |
| | | | | 165/104.33 |
| 8,403,497 | B2 | 3/2013 | Hsiao | |
| 9,316,894 | B2 * | 4/2016 | Dai | G03B 21/16 |
| 2006/0187420 | A1 * | 8/2006 | Wei | G03B 21/16 |
| | | | | 353/61 |
| 2007/0121082 | A1 * | 5/2007 | Fuse | G03B 21/16 |
| | | | | 353/58 |
| 2009/0195757 | A1 * | 8/2009 | Chen | G03B 21/16 |
| | | | | 353/58 |

(Continued)

FOREIGN PATENT DOCUMENTS

| CN | 101644881 A | 2/2010 |
| CN | 103499909 A | 1/2014 |

(Continued)

*Primary Examiner* — William C Dowling

(57) ABSTRACT

A projector includes a casing, an optic engine, a light module, a control circuit module, a first fan module, and a second fan module. The optic engine, the light module, the control circuit module, the first fan module, and the second fan module are disposed in the casing. The first fan module is an axial-flow fan module and has an air inlet and an air outlet. The air inlet is close to and toward the control circuit module; the air outlet is close to and toward the light module. The first fan module generates an air flow flowing through the control circuit module, the first fan module, and the light module in order. The second fan module has an air outlet close to the optic engine. Thereby, heat produced by the above-mentioned components of the projector in the casing can be dissipated efficiently.

19 Claims, 5 Drawing Sheets

(56) References Cited

U.S. PATENT DOCUMENTS

| | | | |
|---|---|---|---|
| 2009/0207382 A1* | 8/2009 | Hsiao | G03B 21/16 353/58 |
| 2011/0032490 A1 | 2/2011 | Hsiao | |
| 2012/0075595 A1* | 3/2012 | Yamamoto | G03B 21/2026 353/58 |
| 2014/0092368 A1 | 4/2014 | Dai | |

FOREIGN PATENT DOCUMENTS

| CN | 103713450 A | 4/2014 |
|---|---|---|
| TW | 200743899 | 12/2007 |

* cited by examiner

PROJECTOR

BACKGROUND OF THE INVENTION

1. Field of the Invention

The invention relates to a projector, and especially relates to a projector having a fan for heat dissipation.

2. Description of the Prior Art

For conventional projectors, a plurality of fans are disposed at the periphery of the casing so that external relative low-temperature air can be drawn into the casing or internal relative high-temperature air in the casing can be drawn out of the casing for heat dissipation. However, many components e.g. light sources, an optic engine, a power controller and so on in the projector will produce heat when in operation. It is still hard to efficiently dissipate the heat produced by all the components just by drawing the external air in or drawing the internal air out or by the both. Especially for the components e.g. the light sources producing much heat, if the heat dissipation efficiency therefor is not good, the temperature of the light source in operation will increase, which induces an energy waste due to a lower energy conversion for the light source, operation instability, and even a failure and also makes the service life of the light source short. The other components also have a similar phenomenon to the above. Furthermore, in a case that a plurality of fans are used, if the fans are not arranged properly, air flows generated by the fans respectively still may interfere with each other even if the fans operate in a high power. The air flows cannot flow smoothly, which leads to turbulence or makes the air flows in some areas flow in a quite low speed or almost stop flowing even leading to failure to dissipate heat produced by the components in the areas. All these phenomenon will influence the heat dissipation efficiency and waste the working capacity of the fans.

SUMMARY OF THE INVENTION

The invention provides a projector with at least one fan disposed properly for efficiently dissipating heat produced by components operating in high temperatures.

A projector according to invention includes a casing, an optic engine, a light module, a control circuit module, a first fan module, and a second fan module. The optic engine, the light module, and the control circuit module are disposed in the casing. The first fan module is an axial-flow fan module disposed in the casing and has a first air inlet and a first air outlet. The first air inlet is close to and toward the control circuit module. The first air outlet is close to and toward the light module. The first fan module generates an air flow flowing through the control circuit module, the first fan module, and the light module in order. Therein, for most cases, the operation temperature of the control circuit module is much lower than the operation temperature of the light module, so the temperature of the air flow generated by the first fan module, after flowing through the control circuit module, is still lower than the operation temperature of the light module, so that the air flow still can effectively dissipate heat produced by the light module. The second fan module is disposed in the casing and has a second air outlet close to the optic engine. The second fan module generated an air flow flowing through the second fan module and the optic engine in order. Thereby, by properly disposing the first fan module and the second fan module so that the light module and the optic engine correspond to the air flows generated by the first fan module and the second fan module respectively, said projector according to the invention can efficiently dissipate heat produced in operation by the control circuit module, the light module, and the optic engine.

Another projector according to invention includes a casing, an optic engine, a light module, a control circuit module, and a first fan module. The optic engine, the light module, and the control circuit module are disposed in the casing. The first fan module is an axial-flow fan module disposed in the casing and has a first air inlet and a first air outlet. The first air inlet is close to and toward the control circuit module. The first air outlet is close to and toward the light module. The first fan module generates an air flow flowing through the control circuit module, the first fan module, and the light module in order. Therein, the air flow enters the casing in a first direction, flows through the gap, the first fan module, and the light module, and then flows out of the casing in a second direction. The first direction is perpendicular to the second direction. Similarly, for most cases, the operation temperature of the control circuit module is much lower than the operation temperature of the light module, so the temperature of the air flow generated by the first fan module, after flowing through the control circuit module, is still lower than the operation temperature of the light module, so that the air flow still can effectively dissipate heat produced by the light module. Thereby, said projector according to the invention can efficiently dissipate heat produced in operation by the control circuit module and the light module at least.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
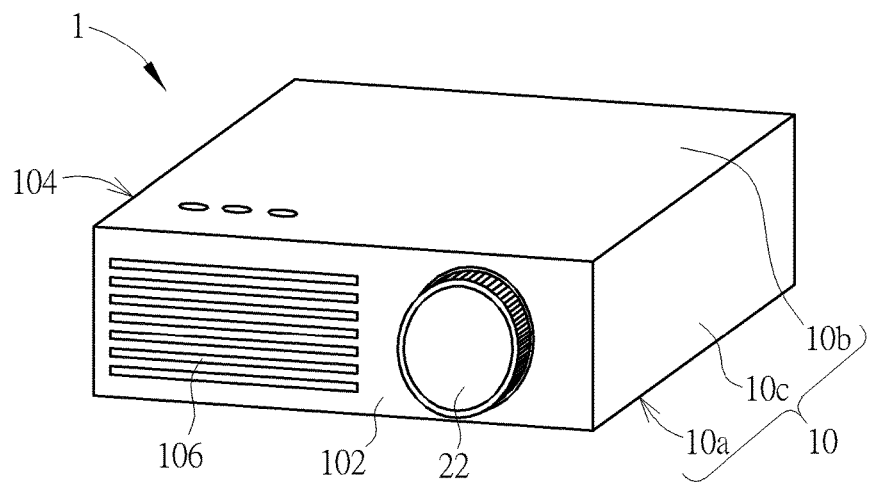
FIG. 1 is a schematic diagram illustrating a projector of an embodiment according to the invention.
Figure 2:
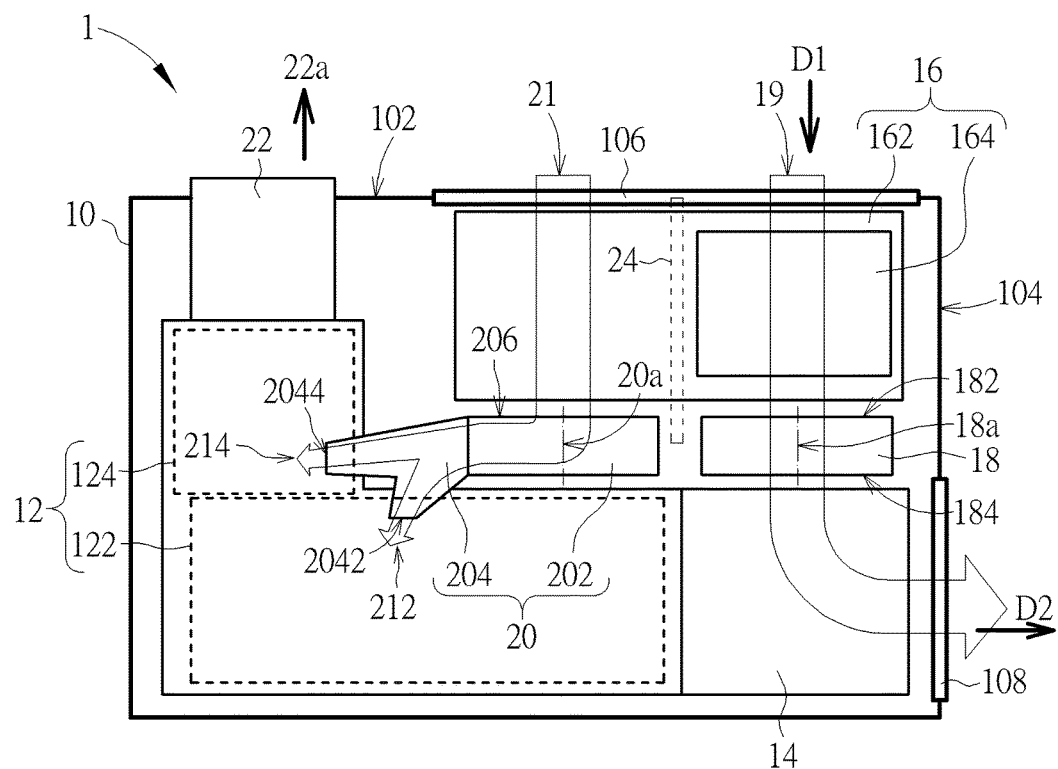
FIG. 2 is a schematic diagram illustrating the disposition of the projector in FIG. 1 in a top view point.

Please refer to FIG. 1 and FIG. 2. FIG. 1 is a schematic diagram illustrating a projector 1 of an embodiment according to the invention. FIG. 2 is a schematic diagram illustrating the disposition of the projector 1 in a top view point. The projector 1 includes a casing 10, an optic engine 12, a light module 14, a control circuit module 16, a first fan module 18, a second fan module 20, and a projection lens 22. In FIG. 2, the profile of the casing 10 is represented by bold lines. The optic engine 12, the light module 14, the control circuit module 16, the first fan module 18, and the second fan module 20 are disposed in the casing 10. The projection lens 22 is coupled to the optic engine 12 and protrudes out from the casing 10. The projection lens 22 has a projection direction 22a and is capable of projecting light in a projection direction 22a onto a screen for forming an image thereon. The first fan module 18 is disposed between the control circuit module 16 and the light module 14 for dissipating heat produced mainly by the control circuit module 16 and the light module 14. The second fan module 20 is disposed close to the optic engine 12 for dissipating heat produced mainly by the optic engine 12. Thereby, the projector 1 can use the first fan module 18 and the second fan module 20 to efficiently dissipate heat produced by main heat-generating components (such as the optic engine 12, the light module 14, the control circuit module 16 and so on) in the projector 1.

For more details, the casing 10 in structure includes a bottom portion 10a, a top portion 10b, and a side wall portion 10c connecting the bottom portion 10a and the top portion 10b, and forms a space for accommodating the above-mentioned components. In FIG. 2, the profile of the casing 10 is substantially equal to the profile of the side wall portion 10c. The casing 10 has a first side 102 and a second side 104 adjacent to the first side 102 at the side wall portion 10c. The projection lens 22 protrudes out from the first side 102. The first side 102 has a first air vent structure 106. The second side 104 has a second air vent structure 108. The second air vent structure 108 is disposed away from the first side 102. In FIG. 2, the occupied areas and positions of the first air vent structure 106 and the second air vent structure 108 are represented by rectangles. In the embodiment, the first air vent structure 106 and the second air vent structure 108 are realized by through holes formed on the side wall portion 10c. The occupied area of the first air vent structure 106 substantially corresponds to the occupied area of the control circuit module 16; the occupied area of the second air vent structure 108 substantially corresponds to the occupied area of the light module 14. However, the invention is not limited thereto.

The first fan module 18 is an axial-flow fan module and has a first rotation axis 18a (indicated by a center line in FIG. 2); i.e. the blades of the axial-flow fan rotate around the first rotation axis 18a. The first fan module 18 has a first air inlet 182 and a first air outlet 184. In the embodiment, the first fan module 18 is a simple axial-flow fan, so the directions of the first air inlet 182 and the first air outlet 184 and the first rotation axis 18a are parallel or disposed in the same direction. The first air inlet 182 is disposed close to and toward the control circuit module 16. The first air outlet 184 is disposed close to and toward the light module 14. Therefore, an air flow 19 (indicated by a hollow arrow in FIG. 2) generated by the first fan module 18 flows through the control circuit module 16, the first fan module 18, and the light module 14 in order. Furthermore, the first air inlet 182 is disposed toward the first air vent structure 106 and the first air outlet 184 is disposed also close to the second air vent structure 108, so that after entering the casing 10 through the first air vent structure 106, the air flow 19 flows through the control circuit module 16, the first fan module 18, and the light module 14 and then flows out of the casing 10 through the second air vent structure 108. In other words, the air flow 19 enters the casing 10 in a first direction D1, flows through the control circuit module 16, the first fan module 18, and the light module 14, and then flows out of the casing 10 in a second direction D2; therein, the first direction D1 is perpendicular to the second direction D2. Therefore, the flowing path of the air flow 19 passes through the control circuit module 16, the first fan module 18, and the light module 14 directly and smoothly, which is conducive to the heat dissipation efficiency. In addition, after having absorbed heat, the air flow 19 departs from the second side 104 of the projector 1 in the second direction D2 (i.e. in a direction perpendicular to the projection direction 22a and away from the projection lens 22). The design that the air flow 19 is away from the projection lens 22 is conducive to an avoidance of influence on the image projection by the projection lens 22.

The second fan module 20 is disposed between the control circuit module 16 and the optic engine 12 and includes a centrifugal fan 202 and a flow guiding structure 204. The flow guiding structure 204 is connected to an air outlet of the centrifugal fan 202 and guides and splits an air flow 21 generated by the centrifugal fan 202. The second fan module 20 has a second rotation axis 20a (indicated by a center line in FIG. 2). In the embodiment, the blades of the centrifugal fan 202 rotate around the second rotation axis 20a. The second fan module 20 has a second air inlet 206 and a second air outlet. Therein, the second air outlet is realized by an air outlet of the flow guiding structure 204; that is, the flow guiding structure 204 includes the second air outlet. The second air outlet is disposed close to the optic engine 12. In the embodiment, the second air inlet 206 is disposed close to and toward the control circuit module 16, so an air flow 21 (indicated by a hollow arrow in FIG. 2) generated by the second fan module 20 flows through the control circuit module 16, the second fan module 20, and the optic engine 12 in order. Furthermore, the second air inlet 206 is also disposed toward the first air vent structure 106, so that after entering the casing 10 through the first air vent structure 106, the air flow 21 flows through the control circuit module 16, the second fan module 20, and the optic engine 12 smoothly. Therefore, the flowing path of the air flow 21 passes through the control circuit module 16, the second fan module 20, and the optic engine 12 directly and smoothly, which is conducive to the heat dissipation efficiency. Afterwards, the air flow 21 has absorbed heat and departs from the casing 10 through air vent structures (not shown in the figures, e.g. through holes formed on the side wall portion 10c and close to the optic engine 12) of the casing 10 close to the optic engine 12.

In the embodiment, the optic engine 12 includes a light splitting module 122 and at least one light modulation module 124, which are represented by rectangles in dashed lines in FIG. 2. Therein, the at least one light modulation module 124 is represented by one single rectangle in dashed lines. In practice, the at least one light modulation module 124 may include a plurality of light modulation modules 124, for example, for producing RGB image lights respectively. The flow guiding structure 204 forms a plurality of passages therein for splitting the air flow 21. Therefore, the air outlet of the second fan module 20 (i.e. the outlet of the flow guiding structure 204) includes a first passage opening 2042 and at least one second passage opening 2044 correspondingly. Therein, for convenient interpretation, the at least one second passage opening 2044 is shown by one in FIG. 2. The first passage opening 2042 is disposed close to and toward the light splitting module 122. The at least one second passage opening 2044 is disposed close to and toward the at least one light modulation module 124 in a one-to-one or one-to-many way. Therefore, the air flow 21 is guided and split into a first sub-air flow 212 and at least one second sub-air flow 214 by the flow guiding structure 204. The first sub-air flow 212 and the at least one second sub-air flow 214 flow out of the flow guiding structure 204 through the first passage opening 2042 and the at least one second passage opening 2044 respectively and blow the light splitting module 122 and the at least one light modulation module 124 respectively for dissipating heat produced by the light splitting module 122 and the at least one light modulation module 124. The first sub-air flow 212 and the at least one second sub-air flow 214 that have absorbed the heat can flow out of the casing 10 through the air vent structures nearby of the casing 10. It is added that the positions of the first passage opening 2042 and the second passage opening 2044 are shown just for the interpretation. In practice, the first passage opening 2042 and the second passage opening 2044 of the flow guiding structure 204 can be structurally integrated into the optic engine 12, which is conducive to the heat dissipation efficiency.

In the embodiment, the first rotation axis 18a and the second rotation axis 20a are parallel. The air flows 19 and 21 do not interfere with each other substantially, which is conducive to the stability of heat dissipation of the air flows 19 and 21. In practice, the projector 1 can further include a partition plate 24 (shown by a long rectangle in dashed lines in FIG. 2) disposed in the casing 10 between the first fan module 18 and the second fan module 20, which can improve the stability of independence of the flowing of the air flows 19 and 21 further. Furthermore, the directions of the first air inlet 182 and the first air outlet 184 are parallel to the partition plate 24, so the partition plate 24 will not obstruct the flowing of the air flow 19 and even can provide a guiding effect in a certain degree to the air flow 19 so that the air flow 19 flows more smoothly. In addition, in the embodiment, each of the first fan module 18 and the second fan module 20 (or the centrifugal fan 202) has a rectangular profile from the view point as FIG. 2. The first fan module 18 and the second fan module 20 are disposed side by side in the lengthwise direction of the rectangular profile; that is, the first fan module 18 and the second fan module 20 are disposed side by side in the direction perpendicular to the first rotation axis 18a (or the second rotation axis 20a), which is conducive to the utilization of the space in the casing 10. As shown by FIG. 2, although the inner components of the projector 1 are compactly disposed, the first fan module 18 and the second fan module 20 still can dissipate heat efficiently.

Figure 3:
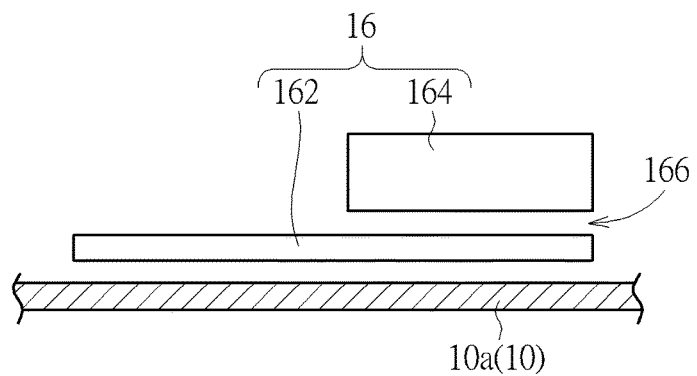
FIG. 3 is a schematic diagram illustrating the disposition of a control circuit module of the projector in FIG. 1 in a side view point.

In addition, both the first fan module 18 and the second fan module 20 provide heat dissipation to the control circuit module 16. In the embodiment, the control circuit module 16 includes a power module 162 and a ballast 164. In a top view point, the ballast 164 and the power module 162 overlap. A gap 166 exists between the ballast 164 and the power module 162 so that the air flow 19 can pass through. A schematic diagram illustrating the disposition therefor in a side view point is shown by FIG. 3. The first air inlet 182 is disposed close to and toward the power module 162 and the ballast 164. The second air inlet 206 is disposed close to and toward the power module 162. Therefore, the dissipation of the heat produced by the control circuit module 16 is performed by the first fan module 18 and the second fan module 20 together; therein, the first fan module 18 takes charge of dissipating the heat produced mainly by the ballast 164 and the light module 14, and the second fan module 20 takes charge of dissipating heat produced mainly by the optic engine 12. The above allotment of heat dissipation is conducive to a loading balance between the first fan module 18 and the second fan module 20 and also can avoid harmful effect (e.g. an energy waste or a reduction of the service life) due to an excessively high power operation of the first fan module 18 or the second fan module 20.

Figure 4:
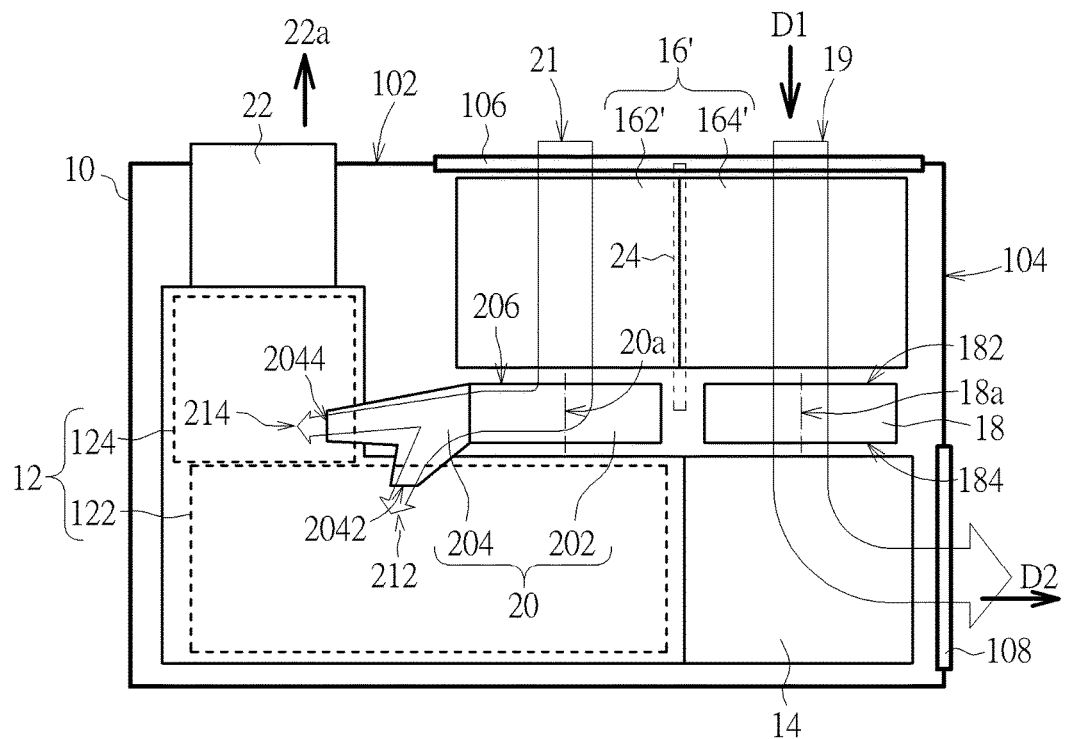
FIG. 4 is a schematic diagram illustrating the configuration of a projector according to another embodiment in a top view point.
Figure 5:
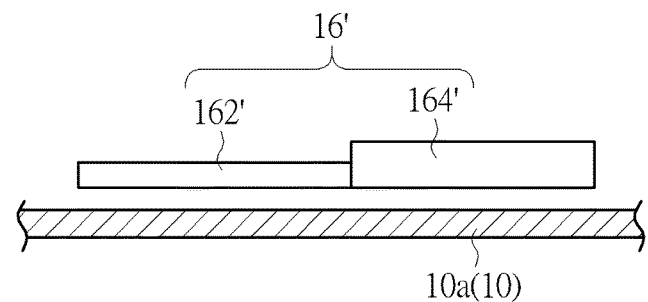
FIG. 5 is a schematic diagram illustrating the disposition of a control circuit module of the projector in FIG. 4 in a side view point.

It is added that in practice, the power module 162 and the ballast 164 also can be disposed side by side. As shown by FIG. 4, a power module 162' and a ballast 164' of a control circuit module 16' of a projector according to another embodiment are disposed side by side. A schematic diagram illustrating the configuration therefor in a side view point is shown by FIG. 5. The projector shown in FIG. 4 is structurally similar to the projector 1 mentioned above, so the projector shown in FIG. 4 uses the component notations of the projector 1. For other descriptions of the projector shown in FIG. 4, please refer to the relevant descriptions of the projector 1; they will not be repeated. As shown by FIG. 4, heat produced by the power module 162' is dissipated just by the second fan module 20. For most cases, the heat produced by the power module is relatively less than the heat produced by the ballast, so the disposition shown by FIG. 4 still has an effect of balancing the loading of heat dissipation on the first fan module 18 and the second fan module 20.

Figure 6:
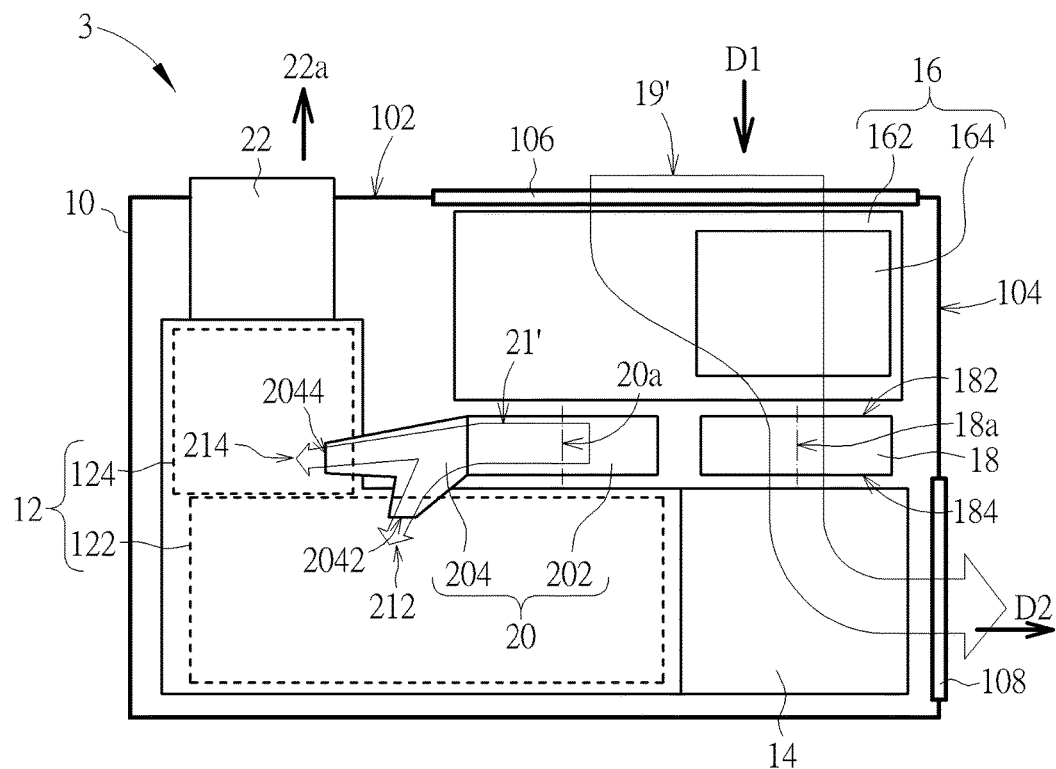
FIG. 6 is a schematic diagram illustrating the configuration of a projector according to another embodiment in a top view point.
Figure 7:
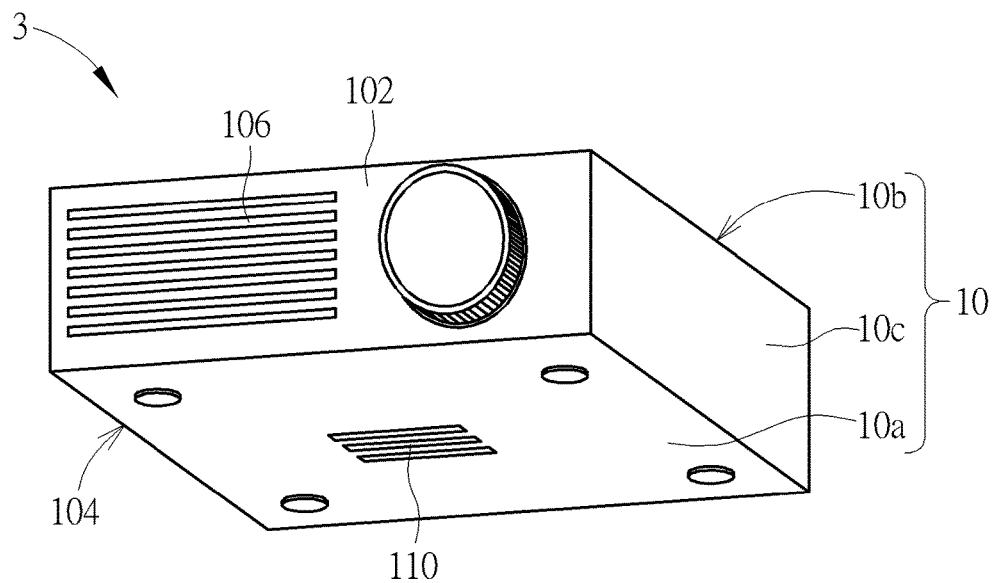
FIG. 7 is a schematic diagram illustrating the projector in FIG. 6.
Figure 8:
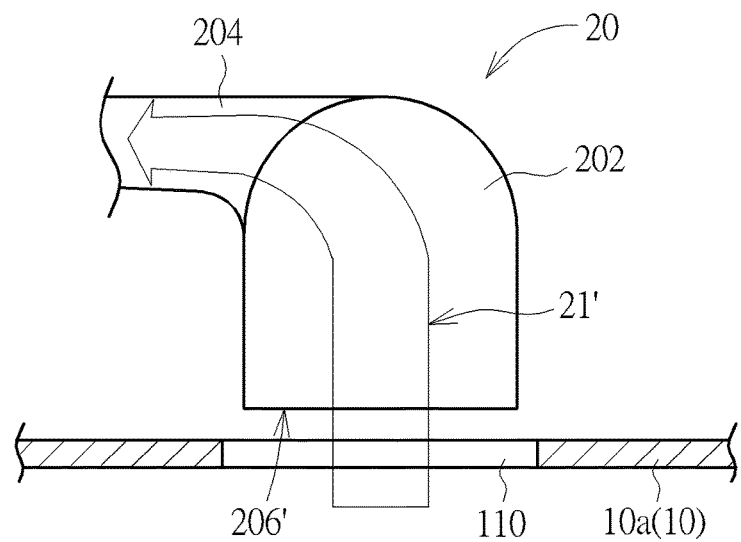
FIG. 8 is a schematic diagram illustrating the disposition of a second fan module of the projector in FIG. 6 in a side view point.

Please refer to FIG. 6 to FIG. 8. FIG. 6 is a schematic diagram illustrating the configuration of a projector 3 according to another embodiment in a top view point. FIG. 7 is a schematic diagram illustrating the projector 3. FIG. 8 is a schematic diagram illustrating the disposition of the second fan module 20 of the projector 3 in a side view point. The projector 3 is structurally similar to the projector 1 mentioned above, so the projector 3 uses the component notations of the projector 1. For other descriptions of the projector 3, please refer to the relevant descriptions of the projector 1; they will not be repeated. In the projector 3, the casing 10 has a third air vent structure 110 at the bottom portion 10a. The second fan module 20 can be provided with a proper guiding structure so that an air inlet 206' of the second fan module 20 is disposed close to and toward the third air vent structure 110. For example, a blocking plate that is fixed on the casing of the centrifugal fan 202 of the second fan module 20 is used for guiding an air flow 21' from the third air vent structure 110 to enter the centrifugal fan 202 from the second rotation axis 20a. The air flow 21' is compressed by the centrifugal fan 202 and blows the optic engine 12 by the flow guiding structure 204 of the second fan module 20. The air flow 21' enters the casing 10 from the bottom thereof; the air flow 19' enters the casing 10 from a side thereof. The direction in which the air flow 21' enters the second fan module 20 is different to the direction in which the air flow 19' enters the first fan module 18, so the air flows 19' and 21' can flow independently from each other without the above-mentioned partition plate 24. It is added that in the embodiment, there is no the division by the partition plate 24, the second fan module 20 makes no influence on the space where the control circuit module 16 is disposed, and the air flow 19' is not limited to flowing only though the space where the ballast 164 is disposed, so in principle, the area close to the first air vent structure 106 can obtain more or less the effect of heat dissipation by the air flow 19'.

Figure 9:
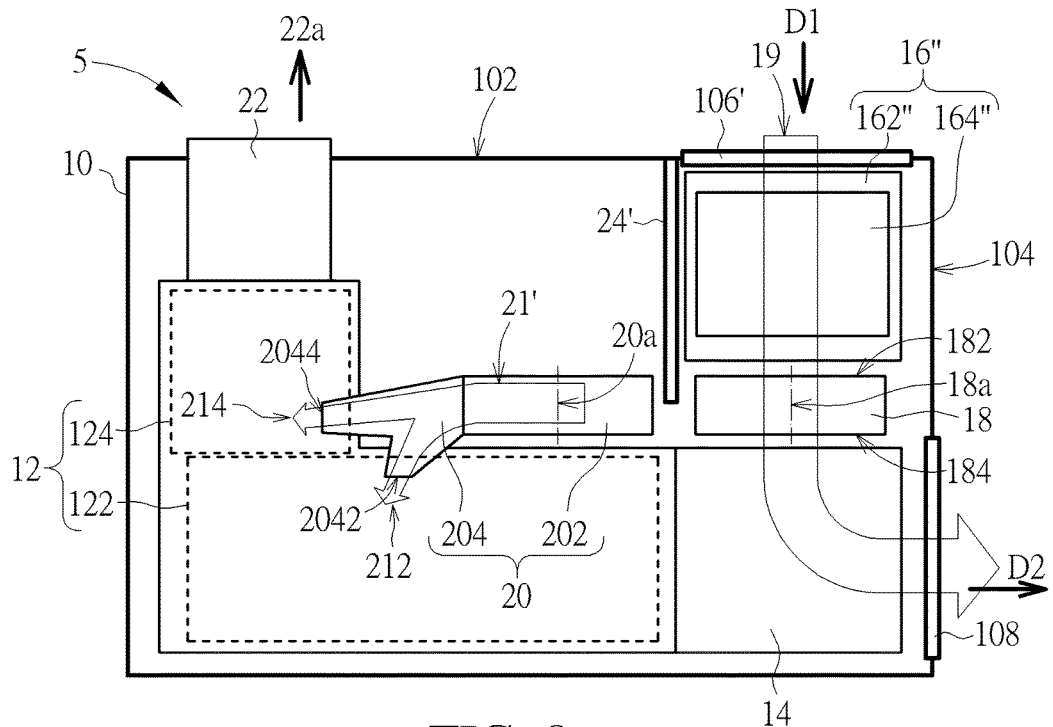
FIG. 9 is a schematic diagram illustrating the configuration of a projector according to another embodiment in a top view point.

Please refer to FIG. 9, which is a schematic diagram illustrating the configuration of a projector 5 according to another embodiment in a top view point. The projector 5 is structurally similar to the projector 1 mentioned above, so the projector 5 uses the component notations of the projector 1. For other descriptions of the projector 5, please refer to the relevant descriptions of the projector 1; they will not be repeated. In the projector 5, the heat produced by the control circuit module 16" (includes a power module 162" and a ballast 164") is dissipated by the first fan module 18. A partition plate 24' (e.g. formed directly by a structural rib plate in the casing 10) is used to isolate the control circuit module 16", so that the heat produced by the control circuit module 16" can be dissipated by the first fan module 18 without interference by the second fan module 20. The second fan module 20 of the projector 5 can be realized by the second fan module 20 of the projector 1 or the second fan module 20 of the projector 3, which will not influence the heat dissipation on the control circuit module 16". In the embodiment, the projector 5 is provided with the second fan module 20 of the projector 3. In addition, the occupied area of the first air vent structure 106' of the casing 10 is in accordance with the disposition of the partition plate 24' and corresponds only to the control circuit module 16", but the invention is not limited thereto.

Figure 10:
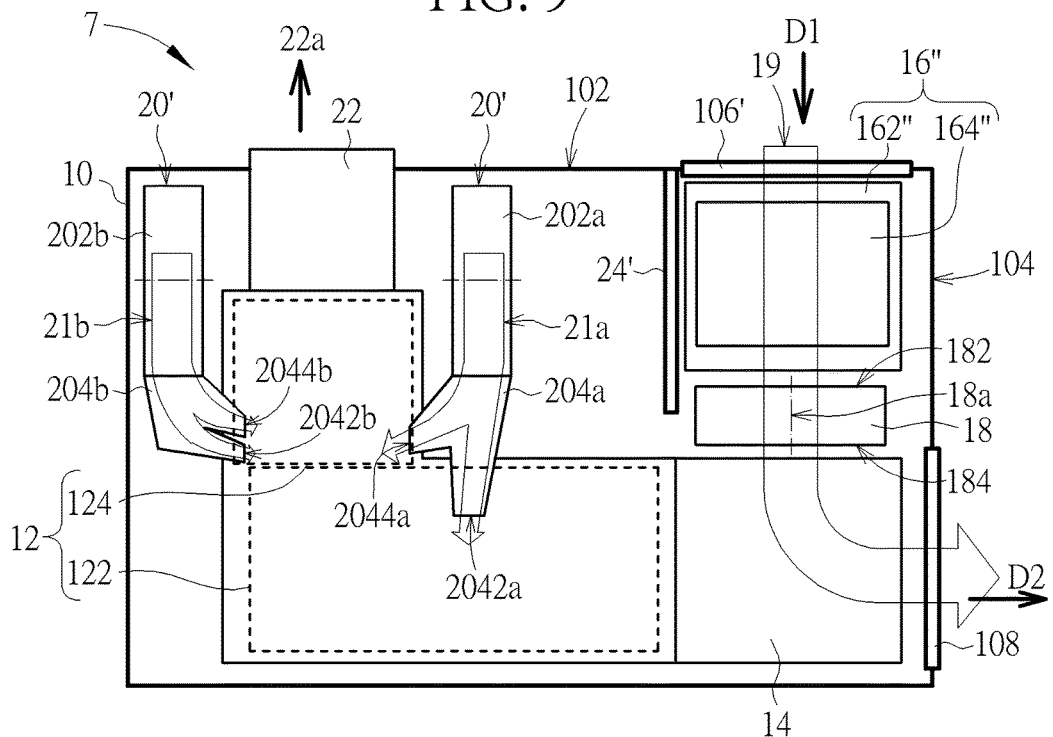
FIG. 10 is a schematic diagram illustrating the configuration of a projector according to another embodiment in a top view point.

Please refer to FIG. 10, which is a schematic diagram illustrating the configuration of a projector 7 according to another embodiment in a top view point. The projector 7 is structurally similar to the projector 5 mentioned above, so the projector 7 uses the component notations of the projectors 1 and 5. For other descriptions of the projector 5, please refer to the relevant descriptions of the projectors 1 and 5; they will not be repeated. In the projector 5, under an allowance of a space configuration (e.g. a certain space existing between the partition plate 24' and the projection lens), the second fan module 20' of the projector 7 includes two centrifugal fans 202a and 202b (of which the rotation axes are indicated by center lines in FIG. 10) and two flow guiding structures 204a and 204b. The centrifugal fans 202a and 202b are disposed parallel to the projection direction 22a at two opposite sides of the projection lens 22; in other words, the rotation axes of the centrifugal fans 202a and 202b are perpendicular to the projection direction 22a, which is conducive to saving the disposition space for the centrifugal fans 202a and 202b. The flow guiding structures 204a and 204b are connected to the centrifugal fans 202a and 202b respectively and guide and split corresponding air flows 21a and 21b generated by the centrifugal fans 202a and 202b. For other descriptions of the centrifugal fans 202a and 202b, please refer to the relevant descriptions of the centrifugal fan 202; they will not be repeated. The flow guiding structure 204a includes passage openings 2042a and 2044a toward the light splitting module 122 and the at least one light modulation module 124 respectively; the flow guiding structure 204b includes passage openings 2042b and 2044b all toward the at least one light modulation module 124. In the embodiment, the second air outlet of the second fan module 20' is realized by the passage openings 2042a, 2044a, 2042b and 2044b. The disposition quantity of the passage openings 2042a, 2044a, 2042b and 2044b depends on the design of the light modulation module 124; for example, the at least one light modulation module 124 includes three light modulation devices for producing RGB image lights respectively. In the embodiment, the second fan module 20' uses the plurality of the centrifugal fans 202a and 202b to improve the heat dissipation efficiency, especially to the light modulation module 124.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector, comprising:
    a casing;
    an optic engine disposed in the casing;
    a light module disposed in the casing;
    a control circuit module disposed in the casing;
    a first fan module disposed in the casing, the first fan module being an axial-flow fan module and having a first air inlet and a first air outlet, the first air inlet being close to and toward the control circuit module, the first air outlet being close to and toward the light module, the first fan module generating an air flow flowing through the control circuit module, the first fan module, and the light module in order; and
    a second fan module disposed in the casing, the second fan module having a second air outlet close to the optic engine;
    wherein the air flow enters the casing in a first direction, flows through the control circuit module, the first fan module, and the light module, and then flows out of the casing in a second direction, and the first direction is perpendicular to the second direction.

2. A projector, comprising:
    a casing;
    an optic engine disposed in the casing;
    a light module disposed in the casing;
    a control circuit module disposed in the casing;
    a first fan module disposed in the casing, the first fan module being an axial-flow fan module and having a first air inlet and a first air outlet, the first air inlet being close to and toward the control circuit module, the first air outlet being close to and toward the light module, the first fan module generating an air flow flowing through the control circuit module, the first fan module, and the light module in order; and
    a second fan module disposed in the casing, the second fan module having a second air outlet close to the optic engine, wherein the second fan module has a second air inlet close to and toward the control circuit module, the second fan module comprises a centrifugal fan and a flow guiding structure connected to an air outlet of the centrifugal fan, the flow guiding structure comprises the second air outlet, the second air outlet comprises a first passage opening and at least one second passage opening, the optic engine comprises a light splitting module and at least one light modulation module, the first passage opening is close to and toward the light splitting module, and the at least one second passage opening is close to and toward the at least one light modulation module respectively.

3. The projector of claim 1, further comprising a projection lens coupled to the optic engine, wherein the casing has a first side and a second side adjacent to the first side, the projection lens protrudes out from the first side, the first side has a first air vent structure, the second side has a second air vent structure, the second air vent structure is disposed away from the first side, and the first air inlet is disposed toward the first air vent structure and the first air outlet is close to the second air vent structure, so that the air flow enters the casing through the first air vent structure and flows out of the casing through the second air vent structure.

4. A projector, comprising:
    a casing;
    an optic engine disposed in the casing;

a light module disposed in the casing;
a control circuit module disposed in the casing;
a first fan module disposed in the casing, the first fan module being an axial-flow fan module and having a first air inlet and a first air outlet, the first air inlet being close to and toward the control circuit module, the first air outlet being close to and toward the light module, the first fan module generating an air flow flowing through the control circuit module, the first fan module, and the light module in order; and
a second fan module disposed in the casing, the second fan module having a second air outlet close to the optic engine;
wherein the control circuit module comprises a power module and a ballast, the power module and the ballast overlaps, a gap exists between the ballast and the power module for the air flow to pass through, and the first air inlet is close to and toward the power module and the ballast.

5. A projector, comprising:
a casing;
an optic engine disposed in the casing;
a light module disposed in the casing;
a control circuit module disposed in the casing;
a first fan module disposed in the casing, the first fan module being an axial-flow fan module and having a first air inlet and a first air outlet, the first air inlet being close to and toward the control circuit module, the first air outlet being close to and toward the light module, the first fan module generating an air flow flowing through the control circuit module, the first fan module, and the light module in order;
a second fan module disposed in the casing, the second fan module having a second air outlet close to the optic engine; and
a partition plate disposed in the casing and between the first fan module and the second fan module.

6. The projector of claim 5, wherein a direction of the first air inlet and a direction of the first air outlet are parallel to the partition plate.

7. The projector of claim 1, wherein the first fan module has a first rotation axis, the second fan module has a second rotation axis, the first fan module and the second fan module are disposed side by side in a direction perpendicular to the first rotation axis, and the first rotation axis and the second rotation axis are parallel.

8. The projector of claim 1, further comprising a projection lens, wherein the casing comprising a side and a bottom portion, the projection lens protrudes out from the side, the bottom portion has a third air vent structure, the second fan module has a second air inlet, and the second air inlet is close to and toward the third air vent structure.

9. The projector of claim 1, wherein the first fan module is disposed between the control circuit module and the light module, the second fan module is disposed between the control circuit module and the optic engine, and the first fan module and the second fan module are disposed side by side.

10. A projector, comprising:
a casing;
an optic engine disposed in the casing;
a light module disposed in the casing;
a control circuit module disposed in the casing;
a first fan module disposed in the casing, the first fan module being an axial-flow fan module and having a first air inlet and a first air outlet, the first air inlet being close to and toward the control circuit module, the first air outlet being close to and toward the light module, the first fan module generating an air flow flowing through the control circuit module, the first fan module, and the light module in order;
a second fan module disposed in the casing, the second fan module having a second air outlet close to the optic engine; and
a projection lens coupled to the optic engine, wherein the projection lens has a projection direction, the second fan module comprises two centrifugal fans disposed parallel to the projection direction at two opposite sides of the projection lens.

11. A projector, comprising:
a casing;
an optic engine disposed in the casing;
a light module disposed in the casing;
a control circuit module disposed in the casing, the control circuit module comprising a power module and a ballast, the power module and the ballast overlapping, a gap existing between the ballast and the power module;
a first fan module disposed in the casing, the first fan module being an axial-flow fan module and having a first air inlet and a first air outlet, the first air inlet being close to and toward the power module and the ballast, the first air outlet being close to and toward the light module, the first fan module generating an air flow flowing through the control circuit module, the first fan module, and the light module in order; and
wherein the air flow enters the casing in a first direction, flows through the gap, the first fan module, and the light module, and then flows out of the casing in a second direction, and the first direction is perpendicular to the second direction.

12. The projector of claim 11, further comprising a second fan module disposed in the casing, wherein the second fan module has a second air inlet and a second air outlet, the second air inlet is close to and toward the control circuit module, the second air outlet is close to the optic engine, the second fan module comprises a centrifugal fan and a flow guiding structure connected to an air outlet of the centrifugal fan, the flow guiding structure comprises the second air outlet, the second air outlet comprises a first passage opening and at least one second passage opening, the optic engine comprises a light splitting module and at least one light modulation module, the first passage opening is close to and toward the light splitting module, and the at least one second passage opening is close to and toward the at least one light modulation module respectively.

13. The projector of claim 11, further comprising a projection lens coupled to the optic engine, wherein the casing has a first side and a second side adjacent to the first side, the projection lens protrudes out from the first side, the first side has a first air vent structure, the second side has a second air vent structure, the second air vent structure is disposed away from the first side, and the first air inlet is disposed toward the first air vent structure and the first air outlet is close to the second air vent structure, so that the air flow enters the casing through the first air vent structure and flows out of the casing through the second air vent structure.

14. The projector of claim 11, further comprising a second fan module and a partition plate, the second fan module being disposed in the casing and having a second air outlet close to the optic engine, the partition plate being disposed in the casing and between the first fan module and the second fan module.

15. The projector of claim 14, wherein a direction of the first air inlet and a direction of the first air outlet are parallel to the partition plate.

16. The projector of claim 11, further comprising a second fan module disposed in the casing, the second fan module having a second air outlet close to the optic engine, wherein the first fan module has a first rotation axis, the second fan module has a second rotation axis, the first fan module and the second fan module are disposed side by side in a direction perpendicular to the first rotation axis, and the first rotation axis and the second rotation axis are parallel.

17. The projector of claim 11, further comprising a second fan module and a projection lens, the second fan module being disposed in the casing, wherein the casing comprising a side and a bottom portion, the projection lens protrudes out from the side, the bottom portion has a third air vent structure, the second fan module has a second air inlet and a second air outlet, the second air inlet is close to and toward the third air vent structure, and the second air outlet is close to the optic engine.

18. The projector of claim 11, further comprising a second fan module, the second fan module being disposed in the casing and having a second air outlet close to the optic engine, wherein the first fan module is disposed between the control circuit module and the light module, the second fan module is disposed between the control circuit module and the optic engine, and the first fan module and the second fan module are disposed side by side.

19. The projector of claim 11, further comprising a projection lens and a second fan module, the projection lens being coupled to the optic engine, the second fan module being disposed in the casing and having a second air outlet close to the optic engine, wherein the projection lens has a projection direction, the second fan module comprises two centrifugal fans disposed parallel to the projection direction at two opposite sides of the projection lens.

* * * * *